US007064933B2

(12) United States Patent
Macken et al.

(10) Patent No.: US 7,064,933 B2
(45) Date of Patent: Jun. 20, 2006

(54) STRUCTURES FOR POLE-TIP ACTUATION

(75) Inventors: Declan Macken, Prior Lake, MN (US); Jeremy Adam Thurn, Eagan, MN (US); Lance Eugene Stover, Eden Prairie, MN (US); Ned Tabat, Chanhassen, MN (US); John Robert Pendray, Edina, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 217 days.

(21) Appl. No.: 10/691,164

(22) Filed: Oct. 22, 2003

(65) Prior Publication Data

US 2005/0088784 A1    Apr. 28, 2005

(51) Int. Cl.
*G11B 5/58* (2006.01)
(52) U.S. Cl. .................................. 360/294.7
(58) Field of Classification Search ............ 360/294.7
See application file for complete search history.

(56) References Cited

U.S. PATENT DOCUMENTS

| | | | | |
|---|---|---|---|---|
| 4,669,011 A | * | 5/1987 | Lemke ........................ | 360/75 |
| 5,313,352 A | * | 5/1994 | Chikazawa et al. ...... | 360/294.7 |
| 5,991,113 A | | 11/1999 | Meyer et al. .................. | 360/75 |
| 6,239,947 B1 | | 5/2001 | Fan et al. .................... | 360/104 |
| 6,344,949 B1 | * | 2/2002 | Albrecht et al. .......... | 360/236.5 |
| 6,374,481 B1 | | 4/2002 | Wachtler et al. .............. | 29/606 |
| 6,441,982 B1 | | 8/2002 | Fukushima et al. ........... | 360/59 |
| 6,473,274 B1 | | 10/2002 | Maimone et al. ........ | 360/294.5 |
| 6,535,355 B1 | | 3/2003 | Boutaghou et al. ...... | 360/245.7 |
| 6,570,730 B1 | * | 5/2003 | Lewis et al. ................... | 360/75 |
| 6,859,346 B1 | * | 2/2005 | Meyer ...................... | 360/294.5 |
| 6,920,020 B1 | * | 7/2005 | Yamanaka et al. .......... | 360/317 |
| 6,992,865 B1 | * | 1/2006 | Thurn et al. ............. | 360/294.7 |
| 2001/0046108 A1 | * | 11/2001 | Lewis et al. ............. | 360/294.7 |
| 2002/0071215 A1 | | 6/2002 | Lewis et al. ............. | 360/235.7 |
| 2003/0053264 A1 | | 3/2003 | Chen et al. .............. | 360/294.4 |
| 2003/0099054 A1 | | 5/2003 | Kamijima ..................... | 360/59 |
| 2003/0161071 A1 | | 8/2003 | Bonin et al. ............. | 360/234.7 |
| 2004/0233583 A1 | * | 11/2004 | Yanagisawa ............. | 360/294.7 |

OTHER PUBLICATIONS

U.S. Appl. No. 09/809,378, filed Mar. 15, 2001, entitled "Bonded Transducer-Level Electrostatic Microactuator for Disc Drive System".
U.S. Appl. No. 09/815,679, filed Mar. 23, 2001, entitled "Transducer-Level Microactuator with Dual-Axis Control".
U.S. Appl. No. 10/465,756, filed Jun. 19, 2002, entitled "Films for Pole-Tip Recession Adjustment".
U.S. Appl. No. 10/462,242, filed Jun. 16, 2003, entitled "Method and Apparatus for Mitigating Thermal Pole Tip Protrusion".

* cited by examiner

*Primary Examiner*—Jefferson Evans
(74) *Attorney, Agent, or Firm*—Leanne R. Taveggia; Westman, Champlin & Kelly, P.A.

(57) ABSTRACT

A slider includes a slider body having a trailing edge and a leading edge. The slider also includes a thin film structure deposited in layers on the trailing edge. The thin film structure includes a write transducer configured to read and write to a storage medium. The thin film structure also includes a non-thermally activated actuator at least partially formed with the write transducer and configured to move the write transducer relative to the trailing edge.

23 Claims, 7 Drawing Sheets

STRUCTURES FOR POLE-TIP ACTUATION

FIELD OF THE INVENTION

The present invention relates generally to data storage systems. In particular, the present invention relates to transducers to read data from, and write data to, a magnetic recording medium.

BACKGROUND OF THE INVENTION

A typical disc drive includes a rigid housing that encloses a variety of disc drive components. The components include one or more rotating discs having data surfaces that are coated with a medium for storage of digital information in a plurality of circular, concentric data tracks. The discs are mounted on a spindle motor that causes the discs to spin and the data surfaces of the discs to pass under respective aerodynamic bearing disc head sliders. Sliders carry transducers which write information to and read information from the data surfaces of the discs. The slider and transducers are often together referred to as the "head."

Typically, transducers include an inductive recording or write transducer for generating a magnetic field that aligns the magnetic moments of the data surfaces to represent desired bits of data. The write transducer includes a magnetic core to record magnetic transitions in the magnetized medium surface of a disc. The core is magnetically coupled to a conductive coil. Electrical current flows through the conductive coil during write operation and generates magnetic flux in the core to record transitions in the magnetic surface coating of the rotating disc or other medium. The magnetic core includes a pair of poles, wherein each pole has a corresponding pole tip adjacent a surface opposing the storage medium. In a write head, for example, the pole tips are positioned on an air-bearing surface (ABS) of the slider.

Typically, the transducers also include a read element that is adapted to read magnetic flux transitions recorded to data tracks on the medium which represent the bits of data. The magnetic flux from the recording medium causes a change in the electrical resistivity of the read element, which can be detected by passing a sense current through the read element and measuring a voltage across the read element. The voltage measurement can then be decoded to determine the recorded data.

With the continuing need to meet the never ending demands for higher disc drive storage capacity, the read/write head-media spacing has been decreasing to pursue higher areal densities. Thermal pole tip protrusion can be a significant percentage of the total nominal spacing between the write transducer and disc. Thus, pole tip protrusion can effect the write performance of the disc drive. For example, the plurality of circular, concentric data tracks on the magnetic medium is divided into data sectors. As electrical current initially conducts through the conductive coil during write operation, the core is heated. The heating of the core results in thermal expansion of the pole tips. As a result of thermal expansion, the pole tips begin to protrude and push the write transducer closer to the surface of the disc, which, when thermally stabilized, results in a more efficient write process. However, there is less pole tip protrusion while the first few data sectors are written than in later data sectors when the temperature of the write transducer has stabilized. The problem may be exacerbated in a low temperature ambient environment because colder ambient temperatures cause the pole tips to recess away from the disc such that the head to media spacing is even greater in the first few data sectors.

Embodiments of the present invention provide solutions to these and other problems, and offer other advantages over the prior art.

SUMMARY OF THE INVENTION

The present invention is directed towards a slider which includes a slider body having a trailing edge and a leading edge. The slider also includes a thin film structure deposited in layers on the trailing edge. The thin film structure includes a write transducer configured to write to a storage medium. The thin film structure also includes a non-thermally activated actuator at least partially formed with the write transducer and configured to move the write transducer relative to the trailing edge.

The present invention is also directed towards a method of manufacturing a slider. The method includes, providing a slider body having a trailing edge and a leading edge. The method also includes forming a thin film structure deposited in layers on the trailing edge. Forming the thin film structure includes forming a write transducer configured to write data to a storage medium and forming a non-thermally activated actuator at least partially with the write transducer and configured to move the write transducer relative to the trailing edge.

Other features and benefits that characterize embodiments of the present invention will be apparent upon reading the following detailed description and review of the associated drawings.

BRIEF DESCRIPTION OF THE DRAWINGS

FIG. 3-1 is a schematic view of a slider in accordance with an embodiment of the present invention.

FIG. 3-2 is an enlarged schematic view of the write transducer and the actuator of FIG. 3-1 in accordance with an embodiment of the present invention.

FIG. 3-3 is a schematic view of a slider in accordance with an embodiment of the present invention.

FIG. 4-1 is a schematic view of a slider in accordance with an embodiment of the present invention.

FIG. 4-2 is a schematic view of a slider in accordance with an embodiment of the present invention.

FIG. 5-1 is a schematic view of a slider in accordance with an embodiment of the present invention.

FIG. 5-2 is a schematic view of a slider in accordance with an embodiment of the present invention.

FIG. 5-3 is a schematic view of a slider in accordance with an embodiment of the present invention.

DETAILED DESCRIPTION OF ILLUSTRATIVE EMBODIMENTS

Figure 1:
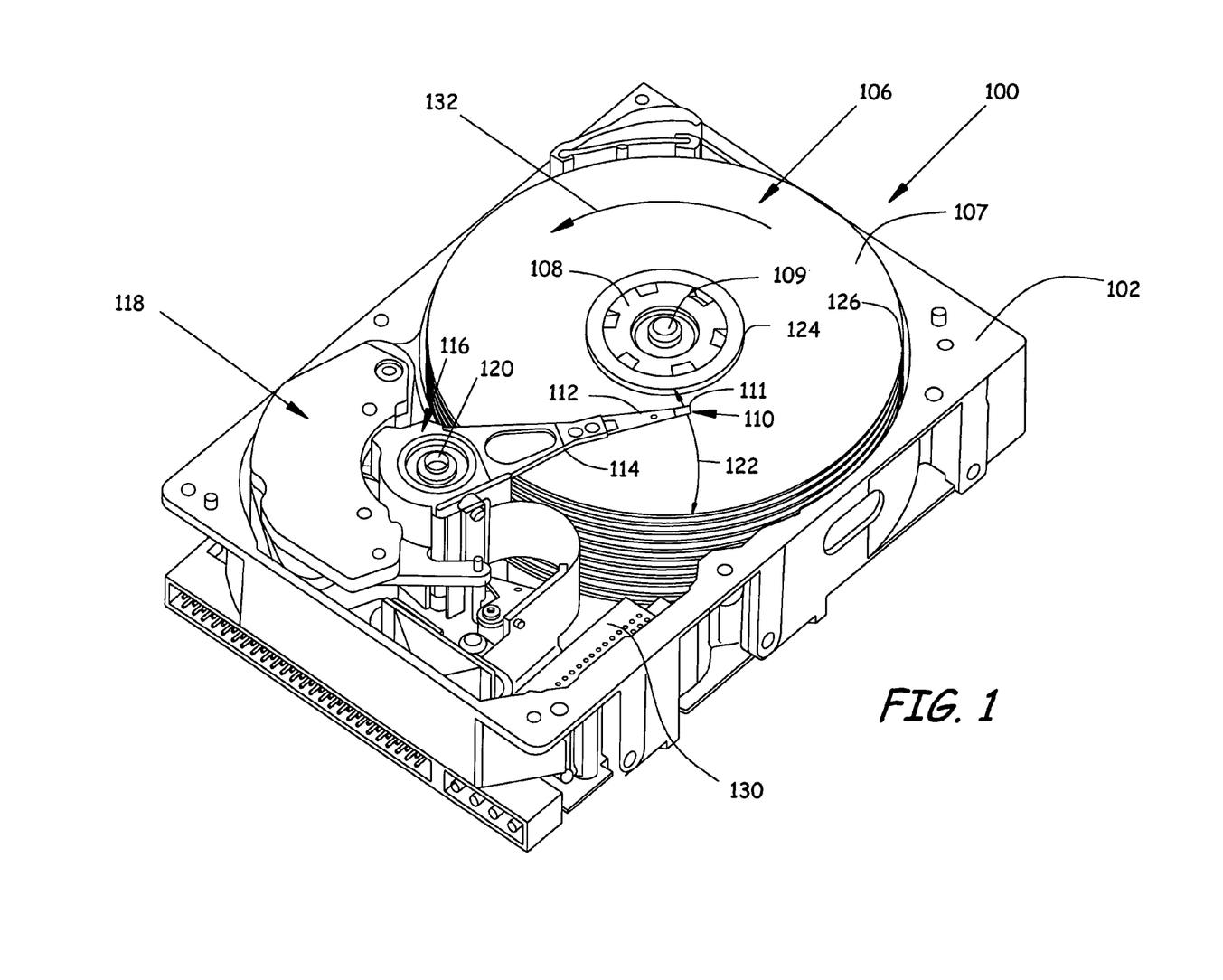
FIG. 1 is a perspective view of a disc drive.

FIG. 1 is a perspective view of disc drive 100 that includes a housing with base deck 102 and top cover (not shown) in which embodiments of the present invention are useful. Disc drives are common data storage systems. Disc drive 100 further includes a disc pack 106, which is mounted on a spindle motor (not shown) by a disc clamp 108. Disc pack 106 can include one or more discs and is illustrated with a plurality of individual discs 107, which are mounted for co-rotation about axis 109 in the direction indicated by arrow 132. Each disc surface has an associated slider 110 that carries read/write transducers 111 for communication with a disc surface. In the example in FIG. 1, slider 110 is supported by suspension 112 that is in turn attached to track accessing arm 114 of an actuator mechanism 116. Actuator mechanism 116 is of the type known as a rotating moving coil actuator and includes a voice coil motor (VCM), shown generally at 118. VCM 118 rotates actuator 116 about pivot shaft 120 to position slider 110 over a desired data track along an arcuate path 122 between a disc inner diameter 124 and a disc outer diameter 126. Slider 110 is coupled to suspension 112 through a gimbal attachment which allows slider 110 to pitch and roll as it rides on an air-bearing surface (ABS) of disc 107. Slider 110 supports transducers 111 at a trailing edge. Transducers 111 include separate reading and writing elements for reading data from, and recording data to disc 107.

During operation, as disc 107 rotates, air is dragged under the ABS of slider 110 in a direction approximately parallel to the tangential velocity of disc 107. As the air passes beneath the bearing surfaces, air compression along the air flow path causes the air pressure between the disc surface and the bearing surfaces to increase, which creates a hydrodynamic lifting force that counteracts a load force provided by suspension 112. This hydrodynamic lifting force causes the slider 110 to "fly" above, and in close proximity, to the disc surface of disc 107.

VCM 118 is driven by electronic circuitry 130 based on signals generated by transducers 111 and a host computer (not shown). During operation, electronic circuitry 130 receives position information indicating a portion of disc 107 to be accessed. Electronic circuitry 130 receives the position information from an operator, from a host computer, or from another suitable controller. Based on the position information, electronic circuitry 130 provides a position signal to actuator mechanism 116. Once transducers 111 are appropriately positioned over a specified track on disc 107, electronic circuitry 130 then executes a desired read or write operation.

Figure 2:
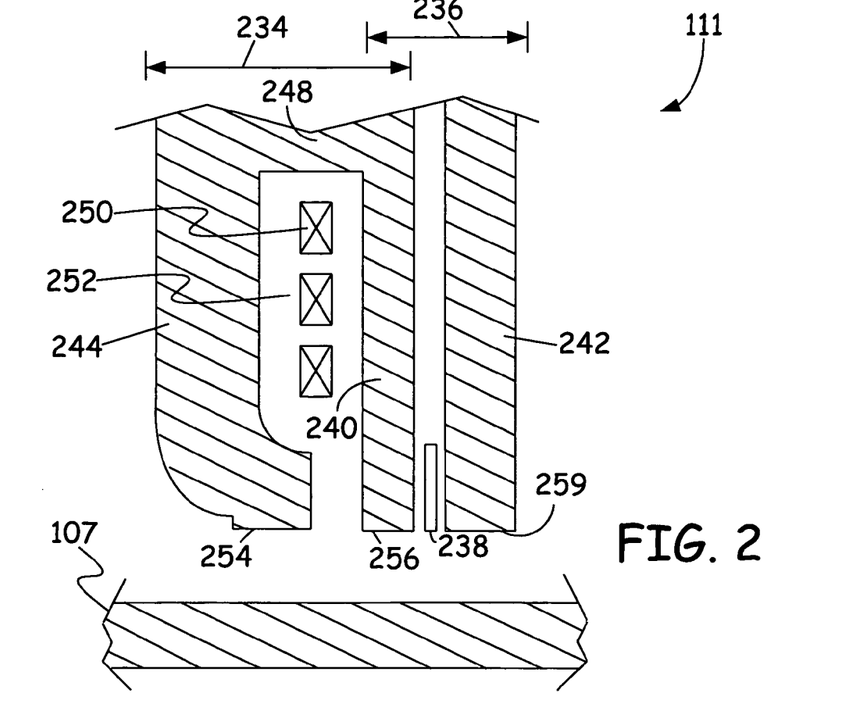
FIG. 2 is a section view of read/write transducers.

FIG. 2 is a section view of a portion of read/write transducers 111 and disc 107. Transducers 111 include write transducer 234 and read transducer 236 which are both formed in the thin film structure deposited on the trailing edge of the slider. Read transducer 236 includes a read element 238 that is spaced between a first pole 240, which operates as a top shield, and a bottom shield 242. The top and bottom shields operate to isolate read transducer 236 from external magnetic fields that could affect sensing bits of data recorded on disc 107. Write transducer 234 includes second pole 244 and first pole 240. The first and second poles 240 and 244 are connected at back via 248. A conductive coil 250 extends between first pole 240 and second pole 244 and around back via 248. An insulating material 252 electrically insulates conductive coil 250 from first and second poles 240 and 244. First and second poles 240 and 244 include first and second pole tips 256 and 254, respectively, which face the surface of disc 107 and form a portion of the ABS 259.

Thermal pole tip protrusion can be a significant percentage of the total nominal spacing between transducers 111 and the surface of disc 107, which has a high areal density. As electrical current conducts through conductive coil 250 during write operation, write transducer 234 is heated. The heating of write transducer 234 results in thermal expansion of the pole tips 254 and 256. As a result of thermal expansion, pole tips 254 and 256 protrude and push write transducer 234 closer to disc 107, which, when thermally stabilized, result in a more efficient write process. However, there is less pole tip protrusion while the first few data sectors of disc 107 are written than in later data sectors when the temperature of write transducer 234 has stabilized. Thus, thermal pole tip protrusion can detrimentally effect the write performance of the disc drive. While a variety of different types of transducers can be used, the term pole tip protrusion is used herein to refer to protrusion of the write transducer from the head into the head-media spacing. To prevent data errors written to disc 107 before write transducer 234 is thermally stabilized, the present invention is a non-thermally activated actuator formed with transducers 111 and the thin film structure. This non-thermally activated actuator allows fast response time with precise control of transducers 111, without the need or issues associated with adding thermal energy to transducers 111. As defined herein, a "non-thermally activated actuator" is an actuator having an actuation mechanism which is not thermally induced. For example, magnetostrictive, piezoelectric and shape memory alloys are such actuators. Actuators that rely on thermal expansion, even if "actuated" by a voltage or current, are considered to be thermally activated actuators.

Figure 31:
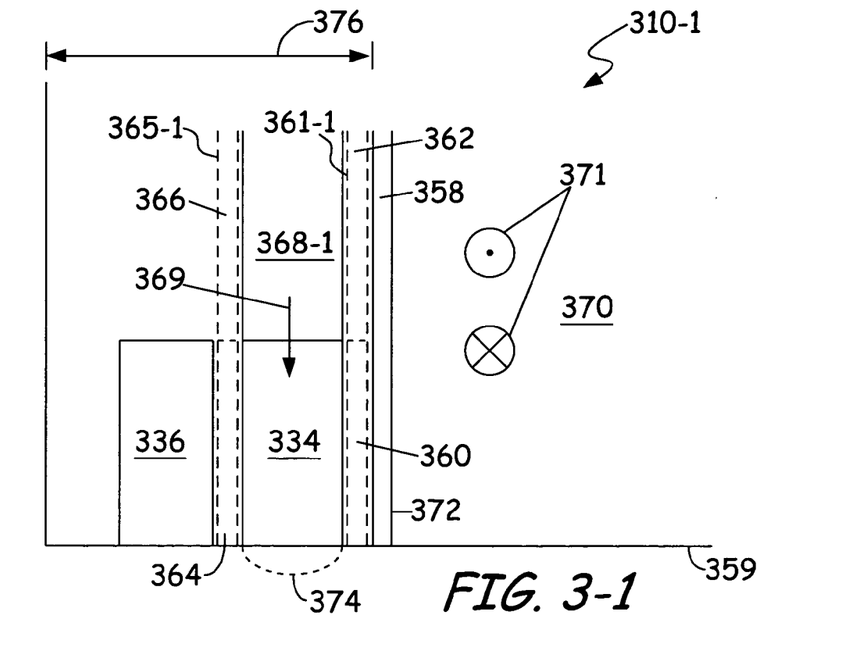

FIG. 3-1 illustrates a schematic view of slider 310-1 in accordance with an embodiment of the present invention. Slider 310-1 includes slider body 370, base coat 358 and thin film structure 376. Slider body 370 includes trailing edge 372 and bearing surface 359. For example, bearing surface 359 is an air bearing surface (ABS). Base coat 358 is deposited on trailing edge 372 to electrically insulate slider body 370 from thin film structure 376. Thin film structure 376 is deposited on base coat 358 in layers and includes write transducer 334, read transducer 336 and non-thermally activated actuator 368-1. As schematically illustrated in FIG. 3-1, write transducer 334 is formed and deposited with non-thermally activated actuator 368-1 on base coat 358. Thereafter, read transducer 336 is deposited on write transducer 334. Actuator 368-1 is positioned coplanar with write transducer 334 and configured to strain write transducer 334 in a direction 369 that is perpendicular to bearing surface 359. The resulting strain causes the write poles of write transducer 334 to protrude perpendicularly to bearing surface 359 as depicted by dashed line 374. Actuator 368-1 can also be configured to strain write transducer 334 in directions 371 that are parallel to bearing surface 359. The resulting strain causes fine-tune placement of write transducer 334 over tracks on the disc, such as disc 107, during track-following mode.

Also shown in FIG. 3-1 are optional first compliant layer 361-1 and optional second compliant layer 365-1. First compliant layer 361-1 and second compliant layer 365-1 are compliant films. The compliant films have properties of low stiffness that can absorb high strain as well as withstand heat treatment. Example materials include dielectrics (glassy or porous) such as silicon oxynitride, polymers and various metals. First compliant layer 361-1 includes first portion 360 and second portion 362. Second compliant layer 365-1 includes first portion 364 and second portion 366. In some embodiments of the present invention, only first portion 360 of first compliant layer 361-1 and first portion 364 of second compliant layer 365-1 are deposited within thin film structure 376. First portions 360 and 364 are deposited on either side of write transducer 334 such that little to no deformation takes place outside of the write poles. In other embodiments of the present invention, all portions of first compliant layer 361-1 and all portions of second compliant layer 365-1 are deposited within thin film structure 376. First complaint layer 361-1 and second compliant layer 365-1 are deposited on either side of write transducer 334 and either side of actuator 368-1 such that little to no deformation takes place outside of the write poles and actuator 368-1. In yet other embodiments of the present invention, only first compliant layer 361-1 is deposited between base coat 358 and both write transducer 334 and actuator 368-1 such that little to no deformation takes place outside of thin film structure 376. Those skilled in the art will recognize that multiple confiigurations of optional first compliant layer 361-1, second compliant layer 365-1 and their corresponding portions 360, 362, 364 and 368 can be used. In addition, other layers containing compliant films may be deposited in thin film structure 376 as long as the layers increase the deformation induced at bearing surface 359, isolate the deformation caused by a stress field (not shown in FIG. 3-1) and reduce the stress in the read transducer 336.

Figure 32:
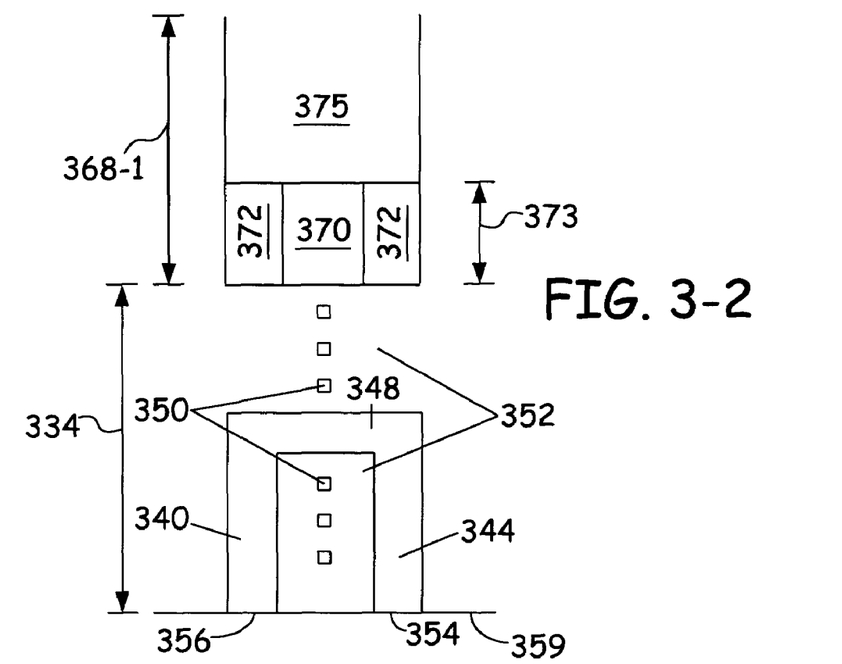

FIG. 3-2 is an enlarged schematic view of write transducer 334 and actuator 368-1 of FIG. 3-1 in accordance with an embodiment of the present invention. Write transducer 334 includes first pole 340 and second pole 344. The first and second poles 340 and 344 are connected at back via 348. A conductive coil 350 extends between first pole 340 and second pole 344 and around back via 348. An insulating material 352 electrically insulates conductive coil 350 from first and second poles 340 and 344. First and second poles 340 and 344 include first and second pole tips 356 and 354, respectively, which face the surface of a disc and form a portion of ABS 359.

Actuator 368-1 includes stress field 373 and actuating material 375. Stress field 373 is tailored to the geometry of actuating material 375 by appropriately depositing films with large and small stiffnesses into layers. As shown in FIG. 3-2, stress field 373 is deposited between write transducer 334 and actuating film 375. Stress field 373 includes low stiffness layer 370 interposed between two high stiffness layers 372. The stiffness of layers 370 and 372 are classified by a modulus of elasticity, or Young's modulus, which is defined as the linear relationship between the stress and the strain of a particular material. For example, films having a large Young's modulus are silicon nitrides and films having a small Young's modulus are silicon oxynitrides. Stress field 373 produces a large stress magnitude near the top and bottom of writer poles 340 and 344 and a small stress magnitude near coils 350.

Figure 33:
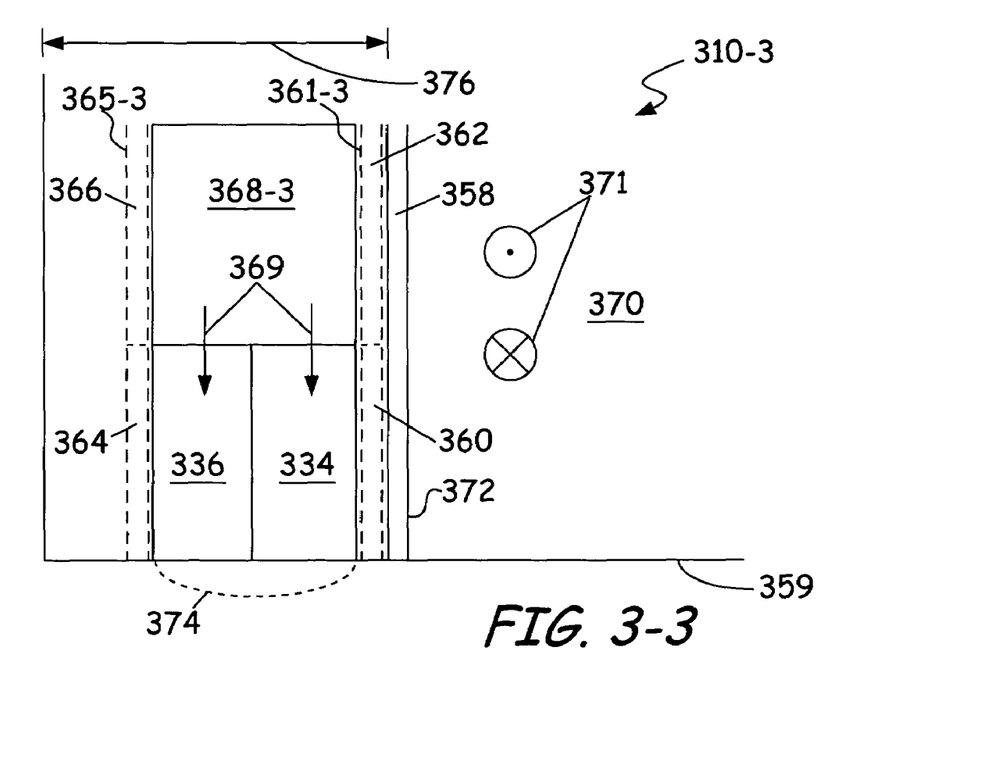

FIG. 3-3 is a schematic view of slider 310-3 in accordance with an embodiment of the present invention. Slider 310-3 includes slider body 370, base coat 358 and thin film structure 376. Slider body 370 includes trailing edge 372 and bearing surface 359. Base coat 358 is deposited on trailing edge 372 to electrically insulate slider body 370 from thin film structure 376. Thin film structure 376 is deposited in layers on base coat 358 and includes write transducer 334, read transducer 336 and non-thermally activated actuator 368-3. As schematically illustrated in FIG. 3-3, write transducer 334 and read transducer are formed and deposited with non-thermally activated actuator 368-3 on base coat 358. Actuator 368-3 is positioned coplanar with both write transducer 334 and read transducer 336. Actuator 368-3 is configured to strain write transducer 334 and read transducer 336 in a direction 369 that is perpendicular to bearing surface 359. The resulting strain causes the write poles of write transducer 334 to protrude perpendicularly to bearing surface 359 as well as the read element of read transducer 336. This protrusion is depicted by dashed line 374. Actuator 368-3 can also be configured to strain write transducer 334 and read transducer 336 in directions 371 that are parallel to bearing surface 359. The resulting strain causes fine-tune placement of write transducer 334 and read transducer 336 over tracks on the disc during track-following mode.

Also shown in FIG. 3-3 are optional first compliant layer 361-3 and optional second compliant layer 365-3 and their corresponding first and second portions 360, 362, 364 and 366 as discussed in FIG. 3-1. In some embodiments of FIG. 3-3, only first portion 360 of first compliant layer 361-3 and first portion 364 of second compliant layer 365-3 are deposited within thin film structure 376. First portion 360 of first layer 361-3 is deposited between base coat 358 and write transducer 334. First portion 364 of second compliant layer 365-3 is deposited on read transducer 336 such that little to no deformation takes place outside of the write poles and read element. In other embodiments of the present invention, both first compliant layer 361-3 and second compliant layer 365-3 are deposited within thin film structure 376. First compliant layer 361 is deposited between base coat 358 and both write transducer 334 and actuator 368-3. Second compliant layer 365-3 is deposited on both read transducer 336 and actuator 368-3 such that little to no deformation takes place outside of the write poles, the read element and actuator 368-3. In yet other embodiments of FIG. 3-3, only first compliant layer 361-3 is deposited between base coat 358 and both write transducer 334 and actuator 368-3 such that little to no deformation takes place outside of thin film structure 376. Those skilled in the art will recognize that multiple configurations of optional first compliant layer 361-3, optional second compliant layer 365-3 and their corresponding portions 360, 362, 364 and 366 can be used. In addition, other layers containing compliant films may be deposited in thin film structure 376 as long as the layers increase the deformation induced at bearing surface 359, isolate the deformation caused by stress field 373 (shown in FIG. 3-2) or reduce the stress in the read transducer 336.

Figure 41:
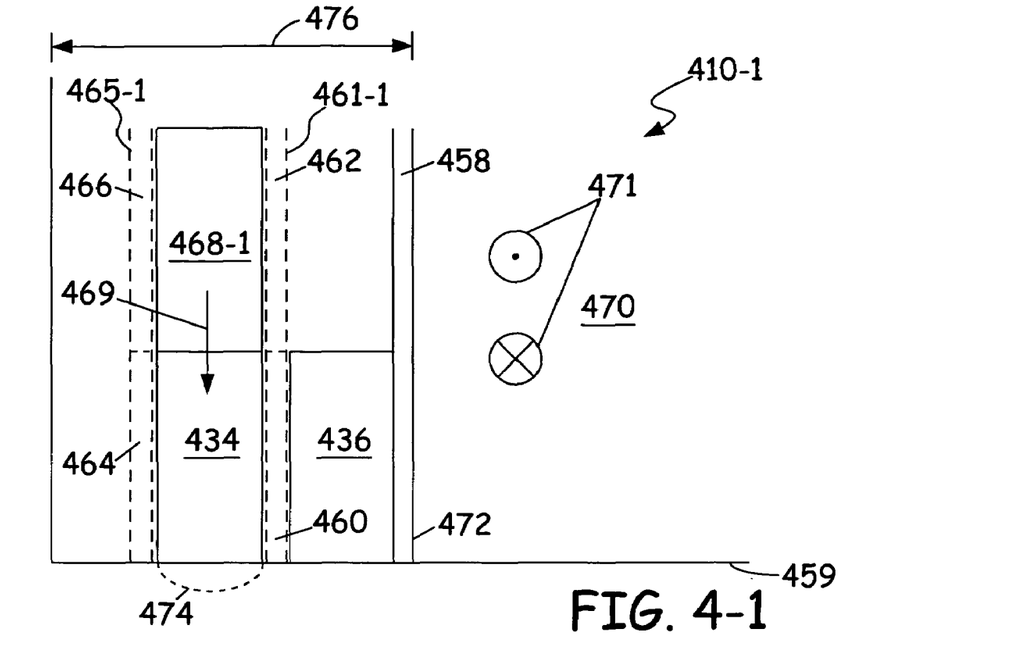

FIG. 4-1 illustrates a schematic view of slider 410-1 in accordance with an embodiment of the present invention. Slider 410-1 includes slider body 470, base coat 458 and thin film structure 476. Slider body 470 includes trailing edge 472 and bearing surface 459. Base coat 458 is deposited on trailing edge 472 to electrically insulate slider body 470 from thin film structure 476. Thin film structure 476 is deposited on base coat 458 in layers and includes write transducer 434, read transducer 436 and non-thermally activated actuator 468-1. As schematically illustrated in FIG. 4-1, read transducer 436 is formed and deposited on base coat 458. Thereafter, write transducer 434 is formed and deposited with actuator 468-1 on read transducer 436. Actuator 468-1 is positioned coplanar with write transducer 434 and configured to strain write transducer 434 in a direction 469 that is perpendicular to bearing surface 459. The resulting strain causes the write poles of write transducer 434 to protrude perpendicularly to bearing surface 459 as depicted by dashed line 474. Actuator 468-1 can also be configured to strain write transducer 434 in directions 471 that are parallel to bearing surface 459. The resulting strain causes fine-tune placement of write transducer 434 and read transducer 436 over tracks on the disc during track-following mode.

Also shown in FIG. 4-1 are an optional first compliant layer 461-1 and an optional second compliant layer 465-1 and their corresponding first and second portions 460, 462, 464 and 466 as were discussed in previous embodiments. In some embodiments of the present invention, only first portion 460 of first compliant layer 461-1 and first portion 464 of second compliant layer 465-1 are deposited within thin film structure 476. First portions 460 and 464 are deposited on either side of write transducer 434 such that little to no deformation takes place outside of the write poles. In other embodiments of the present invention, both first compliant layer 461-1 and second compliant layer 465-1 are deposited within thin film structure 476. First compliant layer 461-1 and second compliant layer 465-1 are deposited on either side of write transducer 434 and either side of actuator 468-1 such that little to no deformation takes place outside of the write poles and actuator 468-1. In yet other embodiments of the present invention, only first compliant layer 461-1 is deposited between read transducer 436 and both write transducer 434 and actuator 468-1 such that little to no deformation takes place outside of thin film structure 476. Those skilled in the art will recognize that multiple configurations of optional first compliant layer 461-1, second compliant layer 465-1 and their corresponding portions 460, 462, 464 and 468 can be used. In addition, other layers containing compliant films may be deposited in thin film structure 476 as long as the layers increase the deformation induced at bearing surface 459, isolate the deformation caused by a stress field (not shown in FIG. 4-1) or reduce the stress in the read transducer 436.

Figure 42:
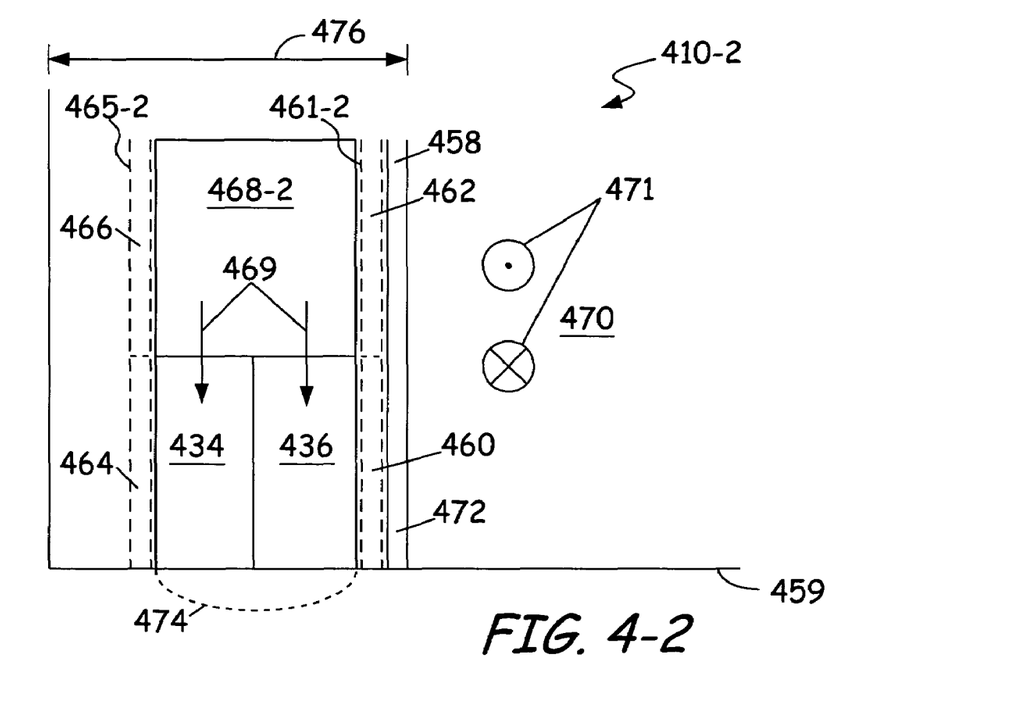

FIG. 4-2 is a schematic view of slider 410-2 in accordance with an embodiment of the present invention. Slider 410-2 includes slider body 470, base coat 458 and thin film structure 476. Slider body 470 includes trailing edge 472 and bearing surface 459. Base coat 458 is deposited on trailing edge 472 to electrically insulate slider body 470 from thin film structure 476. Thin film structure 476 is deposited on base coat 458 and includes write transducer 434, read transducer 436 and non-thermally activated actuator 468-2. As schematically illustrated in FIG. 4-2, read transducer 436 is formed and deposited on base coat 458. Thereafter, transducer 434 is formed and deposited on read transducer 436. Both read transducer 436 and write transducer 434 are formed and deposited with non-thermally activated actuator 468-2. Actuator 468-2 is positioned coplanar with both write transducer 434 and read transducer 436. Actuator 468-2 is configured to strain write transducer 434 and read transducer 436 in a direction 469 that is perpendicular to bearing surface 459. The resulting strain causes the write poles of write transducer 434 to protrude perpendicularly to bearing surface 459 as well as the read element of read transducer 436. This protrusion is depicted by dashed line 474. Actuator 468-2 can also be configured to strain write transducer 434 and read transducer 436 in directions 471 that are parallel to bearing surface 459. The resulting strain causes fine-tune placement of write transducer 434 and read transducer 436 over tracks on the disc during track-following mode.

Also shown in FIG. 4-2 are optional first compliant layer 461-2 and optional second compliant layer 465-2 and their corresponding first and second portions 460, 462, 464 and 466 as discussed in previous embodiments. In some embodiments of is FIG. 4-2, only first portion 460 of first compliant layer 461-2 and first portion 464 of second compliant layer 465-2 are deposited within thin film structure 476. First portion 460 of first compliant layer 461-2 is deposited between base coat 458 and read transducer 436. First portion 464 of second compliant layer 465-2 is deposited on write transducer 434 such that little to no deformation takes place outside of the write poles and the read element. In other embodiments of the present invention, both first compliant layer 461-2 and second compliant layer 465-2 are deposited within thin film structure 476. First layer 461 is deposited between base coat 458 and both read transducer 436 and actuator 468-2. Second compliant layer 465-2 is deposited on both write transducer 436 and actuator 468-2 such that little to no deformation takes place outside of the write poles, read element and actuator 468-2.

In yet other embodiments of FIG. 4-2, only first compliant layer 461-2 is deposited between base coat 458 and both read transducer 436 and actuator 468-2 such that little to no deformation takes place outside of thin film structure 476. Those skilled in the art will recognize that multiple configurations of optional first compliant layer 461-2, optional second compliant layer 465-2 and their corresponding portions 460, 462, 464 and 466 can be used. In addition, other layers containing compliant films may be deposited in thin film structure 476 as long as the layers increase the deformation induced at bearing surface 459, isolate the deformation caused by a stress field (not shown in FIG. 4-2) or reduce the stress in the reader.

As illustrated in FIGS. 3-1 and 3-2, write transducer 344 and actuator 368 are deposited prior to read transducer 336 and are coplanar with each other. As illustrated in FIG. 4-1, read transducer 436 is deposited prior to both write transducer 434 and actuator 468. In some embodiments of the present invention, the actuating material is deposited at room temperature. In this case, the read transducer can be deposited prior to the write transducer as illustrated in FIGS. 4-1 and 4-2. In other embodiments of the present invention, actuator 368, 468 is deposited by physical vapor deposition, chemical vapor or sol-gel deposition (a process involving the transition of a system from a liquid into a gel phase). These methods of deposition may require high-temperature annealing. Thus, the write transducer is preferably deposited prior to the read transducer to prevent excessive heating of the read transducer as illustrated in FIG. 3-1. In those embodiments where heat treatment of the actuating material is needed, a chemically and mechanically polished (CMP) step can follow. The more the actuating material is heat treated the larger the strain.

Figure 51:
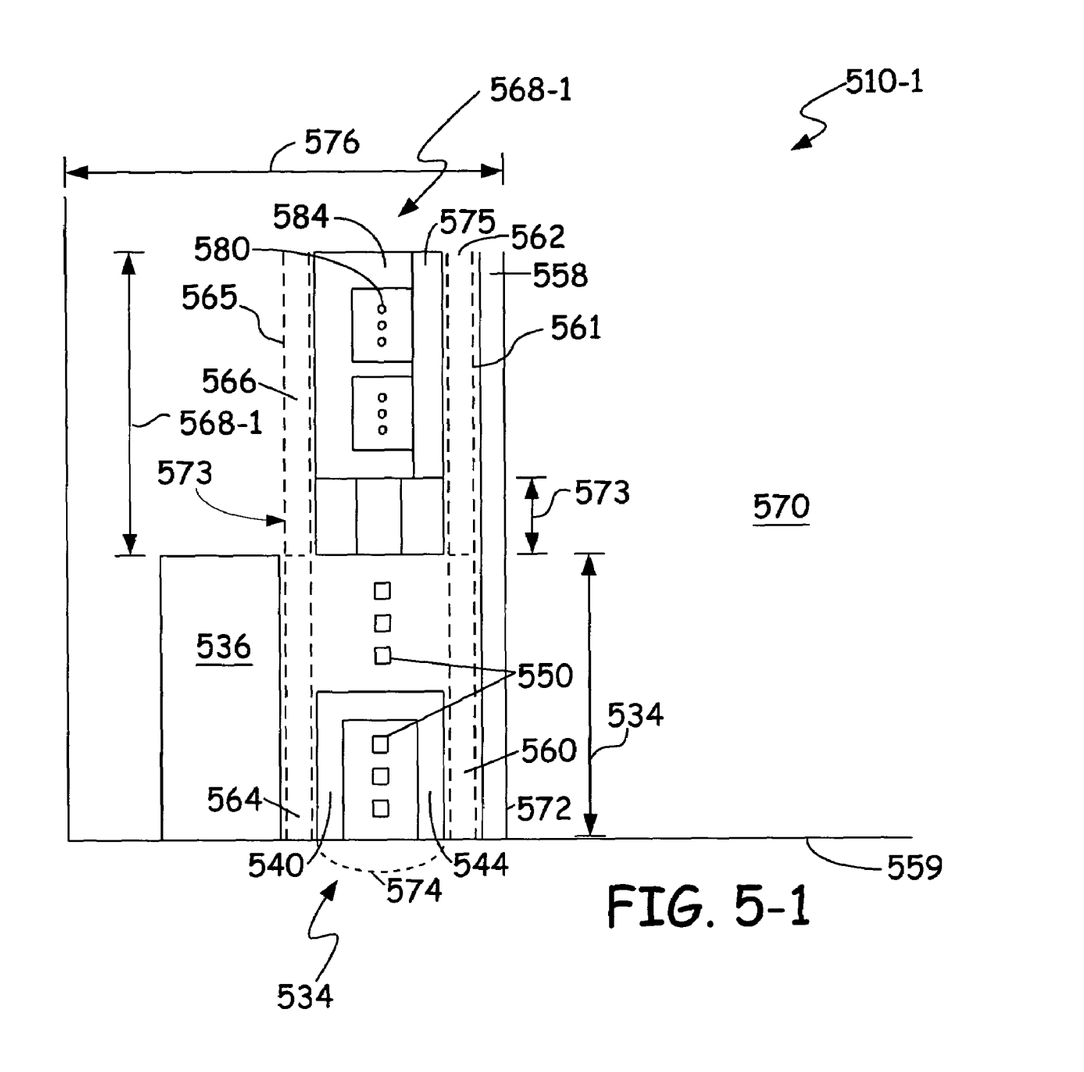
Figure 52:
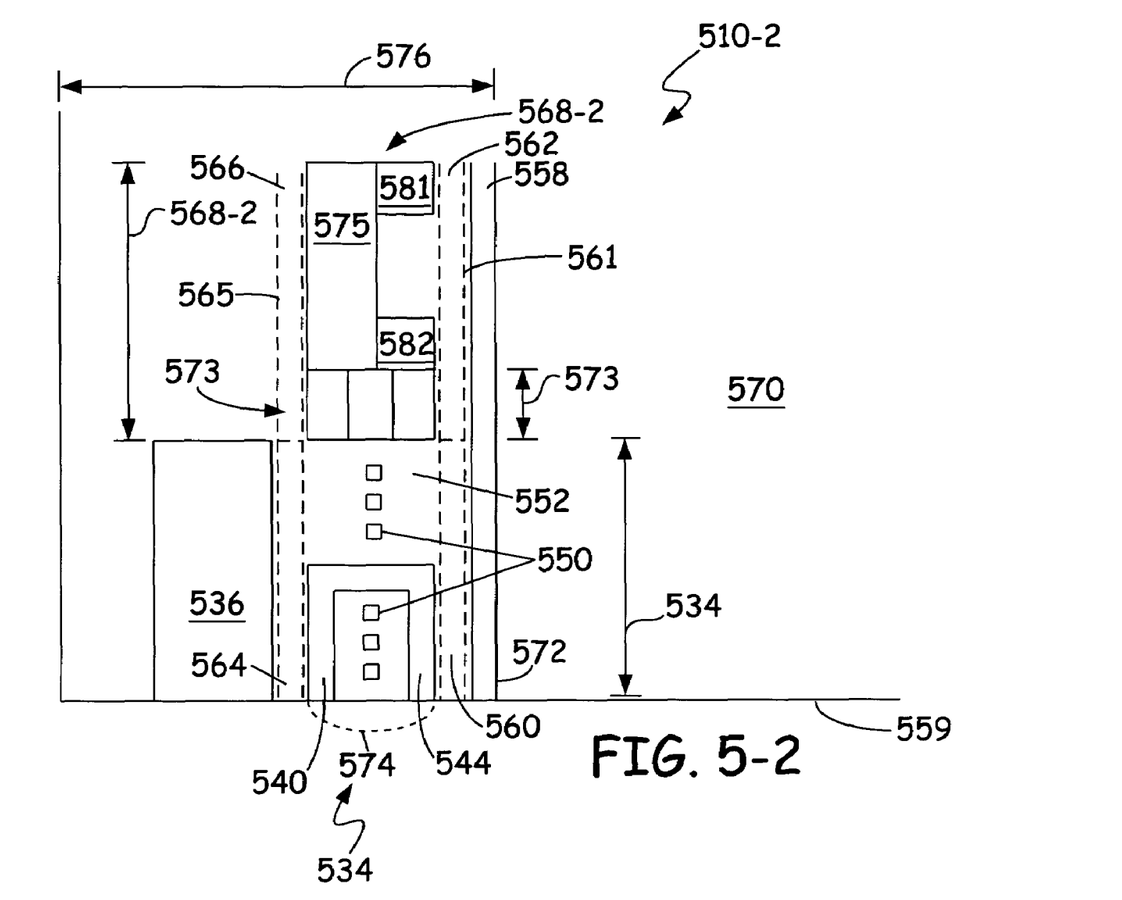
Figure 53:
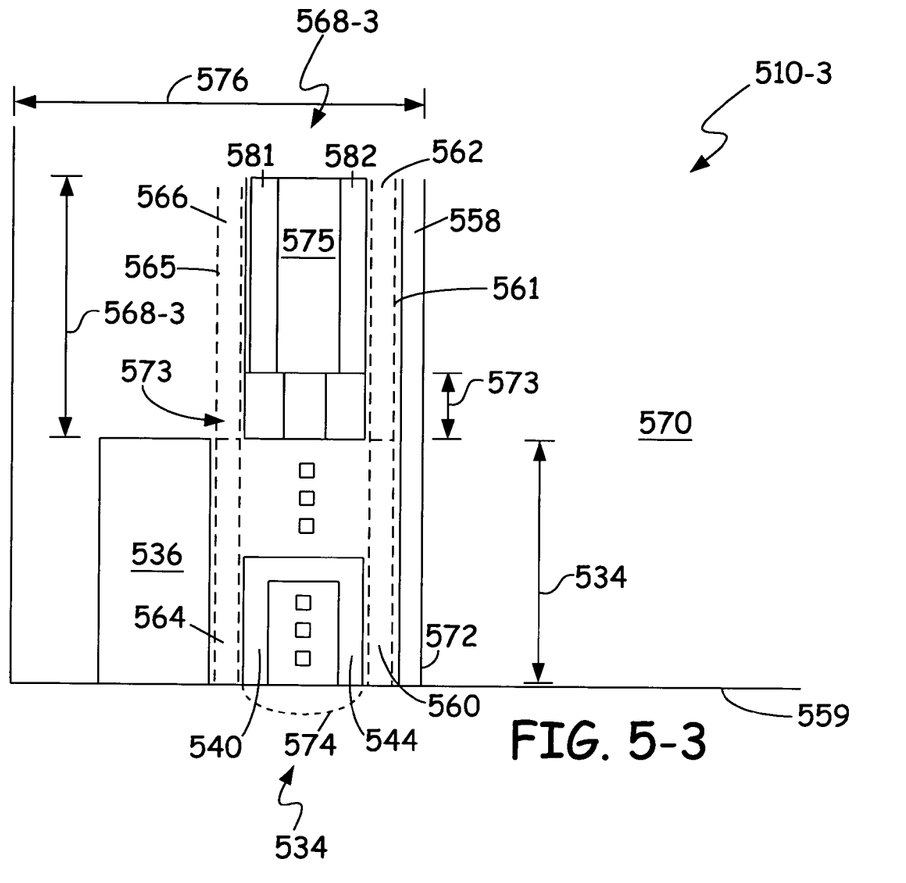

FIGS. 5-1 through 5-3 illustrate embodiments showing specific types of actuators deposited in the thin film structure. Although these specific actuators are illustrated as being deposited with the write transducer, those skilled in the art will appreciate that these specific actuators can be also deposited with the read transducer and write transducer as shown in previous embodiments. In addition, FIGS. 5-1 through 5-3 illustrate the read transducer deposited on the write transducer. Those skilled in the art will appreciate that the write transducer can be deposited on the read transducer as shown in previous embodiments.

FIG. 5-1 is a schematic view of slider 510-1 in accordance with an embodiment of the present invention. Slider 510-1 includes slider body 570, base coat 558 and thin film structure 576. Slider body 570 includes trailing edge 572 and bearing surface 559. Base coat 558 is deposited on trailing edge 572 to electrically insulate slider body 570 from thin film structure 576. Thin film structure 576 is deposited on base coat 558 and includes write transducer 534, read transducer 536 and non-thermally activated actuator 568-1. As schematically illustrated in FIG. 5-1, actuator 568-1 includes actuating material 575, coils 580 and yoke 584. Coils 580 of actuator 568-1 are deposited and formed with coils 550 of write transducer 534. In some embodiments of FIG. 5-1, actuating material 575 can be a magnetostrictive material. For example, the magnetostrictive material can be rare-earth transition metal alloys, such as TbFe and TbFeDy. In other embodiments of FIG. 5-1, actuating material 575 can be a ferromagnetic shape memory alloy having energy associated with rotating the magnetization of the martensitic phase that is higher than energy associated with the twin-boundary motion. Examples of shape memory alloys with this characteristic include NiMnGa and FePd.

Regardless of whether magnetostrictive materials or shape memory alloys are used as the actuating material in FIG. 5-1, actuator 568-1 is driven by electrically conducting coils 580 surrounded by yoke 584. The current running through coils 580 induces a magnetic field in actuator material 575 that is perpendicular to bearing surface 559. The magnetic field causes actuator material 575 to strain in a direction perpendicular to bearing surface 559. The strain is transmitted and enhanced through stress field 573 as discussed in previous embodiments. The resulting strain causes write poles 540 and 544 of write transducer 534 to protrude perpendicularly to bearing surface 559 at their pole tips. This protrusion is depicted by dashed line 574.

Slider 510-1 also includes optional first compliant layer 561, optional second compliant layer 565 and their corresponding portions 560, 562, 564 and 566 as discussed in previous embodiments. In the case of shape memory alloys, actuator 568-1 should be deposited on portion 562 and portion 566 should be deposited on actuator 568-1 to allow free twin-boundary motion.

FIG. 5-2 is a schematic view of slider 510-2 in accordance with an embodiment of the present invention. Slider 510-2 includes slider body 570, base coat 558 and thin film structure 576. Slider body 570 includes trailing edge 572 and bearing surface 559. Base coat 558 is deposited on trailing edge 572 to electrically insulate slider body 570 from thin film structure 576. Thin film structure 576 is deposited on base coat 558 and includes write transducer 534, read transducer 536 and non-thermally activated actuator 568-2. As schematically illustrated in FIG. 5-2, actuator 568-2 includes actuating material 575 and contacts 581 and 582. In some embodiments of FIG. 5-2, actuating material 575 can be a piezoelectric material. Examples of piezoelectric materials include lead zirconate titanate (PZT), barium zirconate titanate, or other suitable piezoelectric materials, such as ceramics single crystals or polymers, which exhibit the desired piezoelectric properties. In other embodiments of FIG. 5-2, actuating material 575 can be a magnetoelectric composite. For example, the magnetoelectric composites can be composites of rare-earth transition metal alloys, such as TbFeDy and piezoelectric materials.

Regardless of whether magnetoelectric composites or piezoelectric materials are used as the actuating film in FIG. 5-2, a voltage is applied across contacts 581 and 582 such that actuator material 575 will expand in a direction perpendicular to bearing surface 559. The voltage differential causes actuator material 575 to strain and is transmitted through stress field 573. This strain causes write poles 540 and 544 of write transducer 534 to protrude perpendicularly to bearing surface 559 at their pole tips. This protrusion is depicted by dashed line 574. Those skilled in the art will recognize that actuating material 575 can be deposited on contacts 581 and 582 (shown in FIG. 5-2) or contacts 581 and 582 can be deposited on actuating material 575. Slider 510-2 also includes optional first compliant layer 561, optional second compliant layer 565 and their corresponding portions 560, 562, 564 and 566 as discussed in previous embodiments.

FIG. 5-3 is a schematic view of slider 510-3 in accordance with an embodiment of the present invention. Slider 510-3 includes slider body 570, base coat 558 and thin film structure 576. Slider body 570 includes trailing edge 572 and bearing surface 559. Base coat 558 is deposited on trailing edge 572 to electrically insulate slider body 570 from thin film structure 576. Thin film structure 576 is deposited on base coat 558 and includes write transducer 534, read transducer 536 and non-thermally activated actuator 568-3. As schematically illustrated in FIG. 5-3, actuator 568-3 includes actuating material 575 interposed between contacts 581 and 582. In some embodiments of FIG. 5-2, actuating material 575 can be a piezoelectric material. Examples of piezoelectric materials are discussed above. In other embodiments of FIG. 5-3, actuating material 578 can be a magnetoelectric composite. An example of a magnetoelectric composite is discussed above.

Regardless of whether magnetoelectric composites or piezoelectric materials are used as the actuating film in FIG. 5-3, once a voltage is applied across contacts 581 and 582, actuator material 578 will shear or distort in shape. The shearing causes strain in a direction perpendicular to bearing surface 559. The voltage differential causes actuator material 575 to strain and is transmitted through stress field 573. This strain results in write poles 540 and 544 of write transducer 534 to protrude perpendicularly to bearing surface 559 at their pole tips. This protrusion is depicted by dashed line 574. Slider 510-3 also includes optional first compliant layer 561, optional second compliant layer 565 and their corresponding portions 560, 562, 564 and 566 as discussed in previous embodiments.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the system while maintaining substantially the same functionality without departing from the scope and spirit of the present invention. Although the present invention was directed to a non-specific bearing surface, it should be noted that any type of air bearing surface without 100% self-compensation can be used in the present invention. In addition, although the preferred embodiment described herein is directed to a slider for carrying transducers, it will be appreciated by those skilled in the art that the teachings of the present invention can be applied to other types of sliders, without departing from the scope and spirit of the present invention.

What is claimed is:

1. A slider comprising:
   a slider body having a trailing edge and a leading edge;
   a thin film structure deposited in layers on the trailing edge, the structure comprising:
   a write transducer; and
   a non-thermally activated actuator at least partially formed coplanar with the write transducer and configured to move the write transducer relative to the trailing edge, the actuator including a first layer, a second layer and a third layer, wherein the second layer is positioned between the first layer and the third layer and has a stiffness, further wherein the first layer and the third layer have a stiffness that is greater then the stiffness of the second layer.

2. The slider of claim 1, wherein the actuator comprises:
   a yoke;
   a conductive coil located within the yoke; and
   an actuating material magnetically coupled to the yoke and conductive coil.

3. The slider of claim 2, wherein the actuating material comprises one of a magnetostrictive material and a feromagnetic shape memory alloy.

4. The slider of claim 1, wherein the actuator comprises:
a pair of conductive contacts; and
an actuating material electrically coupled to the conductive contacts.

5. The slider of claim 4, wherein the actuating material comprises one of a piezoelectric material and a magnetoelectric composite.

6. The slider of claim 4, wherein the actuating material is deposited on the pair of conductive contacts such that the actuating material expands as a voltage is applied across the conductive contacts.

7. The slider of claim 4, wherein the pair of conductive contacts are deposited on the actuating material such that the actuating material expands as a voltage is applied across the conductive contacts.

8. The slider of claim 4, wherein the actuating material is deposited between the pair of conductive contacts such that the actuating material shears as a voltage is applied across the conductive contacts.

9. The slider of claim 1, wherein the thin film structure further comprises a read transducer configured to read data franc, the storage medium, the read transducer formed and deposited adjacent the write transducer.

10. The slider of claim 9, wherein the actuator is at least partially formed and deposited with the write transducer and the read transducer.

11. The slider of claim 9, wherein the read transducer is deposited on the write transducer.

12. The slider of claim 9, wherein the write transducer is deposited on the read transducer.

13. The slider of claim 9 including a first compliant layer deposited prior to the write transducer.

14. The slider of claim 13 including a second compliant layer deposited on one of the write transducer arid the read transducer.

15. The slider of claim 9 including a first compliant layer deposited prior to the read transducer.

16. The slider of claim 15 including a second compliant layer deposited on the write transducer.

17. A method of manufacturing a slider, the method comprising:
providing a slider body having a trailing edge and a leading edge;
forming a thin flint structure deposited in layers on the trailing edge comprising;
forming a write transducer;
forming a non-thermally activated actuator at least partially coplanar with the write transducer and configured to move the write transducer relative to the wailing edge; and
forming a first layer, a second layer and a third layer, wherein the second layer is positioned between the first layer and the third layer and has a stiffness, further wherein the first and third layer have a stiffness that is greater than the stiffness of the second layer.

18. The method of claim 17, wherein forming the actuator further comprises:
depositing an actuating material; and
depositing a conductive coil positioned within a yoke, the yoke magnetically coupled to the conductive coil and the actuating material.

19. The method of claim 18, wherein depositing the actuating material comprises depositing one of a magnetostrictive material and a ferromagnetic shape memory alloy.

20. The method of claim 17, wherein forming the actuator further comprises:
depositing a pair of conductive contacts; and
depositing an actuating material electrically coupled to the conductive contacts.

21. The method of claim 20, wherein depositing the actuating material comprises depositing one of a piezoelectric material and a magnetoelectric composite.

22. The method of claim 17, wherein forming the thin film structure further comprises depositing a first compliant layer and a second compliant layer such that deformation of the write element is isolated and enhanced.

23. A slider comprising:
a slider body having a trailing edge and a leading edge;
a thin film structure deposited in layers on the trailing edge, the structure comprising:
a write transducer configured to write data to a storage medium; and
a non-thermal adtuator means formed at least partially coplanar with the write transducer for moving the write transducer in a direction perpendicular to a bearing surface and relative to the trailing edge.

* * * * *